(12) United States Patent
Yokota et al.

(10) Patent No.: US 11,007,957 B2
(45) Date of Patent: May 18, 2021

(54) BUMPER STRUCTURAL BODY

(71) Applicants: UACJ CORPORATION, Tokyo (JP); HONDA MOTOR CO., LTD., Tokyo (JP)

(72) Inventors: Tomoya Yokota, Tokyo (JP); Tatsuo Inagaki, Tokyo (JP); Keiichiro Tsuji, Saitama (JP); Tomohide Sekiguchi, Saitama (JP); Naoki Takaki, Saitama (JP); Ryo Kita, Saitama (JP)

(73) Assignees: UACJ CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/041,863

(22) PCT Filed: Mar. 29, 2019

(86) PCT No.: PCT/JP2019/014120
§ 371 (c)(1),
(2) Date: Sep. 25, 2020

(87) PCT Pub. No.: WO2019/189804
PCT Pub. Date: Oct. 3, 2019

(65) Prior Publication Data
US 2021/0046889 A1 Feb. 18, 2021

(30) Foreign Application Priority Data
Mar. 30, 2018 (JP) .............................. JP2018-068241

(51) Int. Cl.
*B60R 19/34* (2006.01)
*B60R 19/02* (2006.01)
*B60R 19/03* (2006.01)

(52) U.S. Cl.
CPC ............ *B60R 19/34* (2013.01); *B60R 19/023* (2013.01); *B60R 19/03* (2013.01)

(58) Field of Classification Search
CPC ........ A47B 96/021; B65D 2543/00629; B65D 2543/00685; B65D 2543/00796;
(Continued)

(56) References Cited

U.S. PATENT DOCUMENTS 6,299,226 B1 * 10/2001 Kroning .................. B60R 19/18
293/120
6,712,411 B2 * 3/2004 Gotanda ................. B60R 19/24
293/132

(Continued)

FOREIGN PATENT DOCUMENTS

| JP | 5180950 B2 | 4/2013 |
|---|---|---|
| JP | 2017087928 A | 5/2017 |
| KR | 1020150104900 A | 9/2015 |

OTHER PUBLICATIONS

ISR issued in PCT Application No. PCT/JP2019/014120, dated Jun. 4, 2019.
(Continued)

*Primary Examiner* — Kiran B Patel
(74) *Attorney, Agent, or Firm* — Greer Burns & Crain Ltd.

(57) ABSTRACT

A bumper structural body (100) includes a bumper reinforcement (10), energy absorbing members (30a, 30b), and intermediate members (50a, 50b). The sloped sections (12a, 12b) of the bumper reinforcement (10) are connected to the energy absorbing members (30a, 30b) and the intermediate members (50a, 50b). The intermediate members (50a, 50b) are each formed in a quadrilateral by connecting a first portion (51) contacting the energy absorbing member (30a, 30b), a second portion (52) contacting the bumper reinforce-
(Continued)

ment (10), and portions connecting the first portion (51) and the second portion (52).

2 Claims, 8 Drawing Sheets

(58) Field of Classification Search
CPC ....... B65H 2701/31; B60R 9/06; B60R 19/18; B60R 19/02; B60D 1/56; B60P 3/125
See application file for complete search history.

(56) References Cited

U.S. PATENT DOCUMENTS

| | | | | |
|---|---|---|---|---|
| 9,233,714 | B2* | 1/2016 | Hara | B62D 21/152 |
| 9,925,937 | B2* | 3/2018 | Watanabe | B62D 21/152 |
| 2007/0056819 | A1* | 3/2007 | Kano | F16F 7/12 |
| | | | | 188/371 |
| 2009/0079210 | A1* | 3/2009 | Matsumura | B60R 19/24 |
| | | | | 293/155 |
| 2014/0354008 | A1* | 12/2014 | Sakakibara | B60R 19/34 |
| | | | | 296/187.1 |
| 2015/0021935 | A1* | 1/2015 | Baccouche | B60R 19/34 |
| | | | | 293/114 |
| 2016/0046250 | A1* | 2/2016 | Sotoyama | B62D 21/152 |
| | | | | 293/155 |
| 2016/0059340 | A1* | 3/2016 | Hill | B23K 9/0203 |
| | | | | 428/596 |
| 2016/0121931 | A1* | 5/2016 | Tamaoki | B62D 21/02 |
| | | | | 296/187.09 |
| 2016/0129869 | A1* | 5/2016 | Le | B62D 21/15 |
| | | | | 701/45 |
| 2016/0152273 | A1* | 6/2016 | Kuriyama | B62D 25/08 |
| | | | | 296/187.09 |
| 2016/0318552 | A1* | 11/2016 | Matsumoto | B62D 25/082 |
| 2017/0057439 | A1* | 3/2017 | Holmstrom | B60R 19/023 |
| 2017/0129432 | A1* | 5/2017 | Daido | B62D 21/152 |
| 2017/0144619 | A1* | 5/2017 | Shamoto | B60R 19/023 |
| 2017/0225713 | A1* | 8/2017 | Brandhuber | B62D 21/152 |
| 2018/0170437 | A1* | 6/2018 | Park | B60R 19/24 |
| 2018/0244225 | A1* | 8/2018 | Nakayama | B60R 19/34 |
| 2018/0334121 | A1* | 11/2018 | Sabu | B62D 21/152 |
| 2019/0135210 | A1* | 5/2019 | Kurai | B60R 19/34 |
| 2019/0144039 | A1* | 5/2019 | Ahmed | B60R 19/34 |
| | | | | 296/187.1 |
| 2019/0176735 | A1* | 6/2019 | Hisada | B60R 19/18 |
| 2019/0232906 | A1* | 8/2019 | Eriksson | B60R 19/023 |
| 2019/0256020 | A1* | 8/2019 | Tomomatsu | B60R 19/18 |
| 2019/0291668 | A1* | 9/2019 | Sato | B60R 19/12 |
| 2019/0351854 | A1* | 11/2019 | Bae | B60R 19/18 |
| 2020/0070760 | A1* | 3/2020 | Sotoyama | B60R 19/34 |
| 2020/0231107 | A1* | 7/2020 | Gunther | B60R 19/18 |
| 2020/0238935 | A1* | 7/2020 | Hisada | B60R 19/34 |
| 2020/0269787 | A1* | 8/2020 | Vovesny | B60R 19/18 |
| 2020/0324823 | A1* | 10/2020 | Kawamura | B62D 21/08 |
| 2020/0353987 | A1* | 11/2020 | Yoshida | B62D 21/152 |

OTHER PUBLICATIONS

Written Opinion of the ISA, dated Jun. 4, 2019 (with machine translation).

* cited by examiner

BUMPER STRUCTURAL BODY

This is a National Phase Application filed under 35 U.S.C. § 371, of International Application No. PCT/JP2019/014120, filed Mar. 29, 2019, the contents of which are incorporated by reference.

TECHNICAL FIELD

The present disclosure relates to a bumper structural body.

BACKGROUND ART

A bumper structural body for absorbing impact at a time of collision is provided at the front and the rear of most automobiles. Bumper structural bodies typically include a bumper reinforcement and energy absorbing members. Such bumper structural bodies have a structure whereby impact is received by the bumper reinforcement and the energy absorbing members deform to suppress damage to the vehicle body.

Currently, there is a need to reduce the weight of the bumper structural body, but there are constraints due to vehicle design and the many other required functions such as fine wrapping performance. As such, with regards to shape, it is thought that the design radius of curvature of the bumper reinforcement will become smaller than that of existing bumper structural bodies. If the radius of curvature of the bumper reinforcement becomes smaller, the energy absorbing members will become sloped and, at a time of collision, stress concentrations will occur in the front ends of the energy absorbing members and in the bumper reinforcement. As a result, it is possible that the bumper reinforcement will buckle or crack before the energy absorbing members buckle/deform, thereby making it impossible to efficiently absorb the energy.

Patent Literature 1 proposes a bumper structural body in which an intermediate member is arranged for the purpose of efficiently absorbing impact energy.

CITATION LIST

Patent Literature

Patent Literature 1: Japanese Patent No. 5180950

SUMMARY OF INVENTION

Technical Problem

The bumper structural body of Patent Literature 1 induces buckling of the bumper reinforcement, and is incapable of absorbing energy with greater efficiency as required in recent years. Moreover, it is thought that, since control of the bumper is made difficult due to the buckling of the bumper reinforcement, this bumper structural body may cause damage to the rear parts.

The present disclosure is made in light of the situation described above, and an objective of the present disclosure is to provide a bumper structural body capable of suppressing cracking and buckling of the bumper reinforcement, and efficiently absorbing energy.

Solution to Problem

A bumper structural body according to a first aspect of the present disclosure that achieves the objective described above includes:

a bumper reinforcement extending in a vehicle width direction of a vehicle;

an energy absorbing member connected to a vehicle frame and to the bumper reinforcement; and an intermediate member arranged between the bumper reinforcement and the energy absorbing member, and joined to each of the bumper reinforcement and the energy absorbing member; wherein the bumper reinforcement is joined to each of the energy absorbing member and the intermediate member.

A configuration is possible in which the intermediate member includes:

a first portion joined to the energy absorbing member, a second portion joined to the bumper reinforcement, and a third portion and a fourth portion that connect the first portion to the second portion, the first portion, the second portion, the third portion, and the fourth portion are connected so as to form a quadrilateral, and an angle between the third portion and the fourth portion is larger than an angle between the first portion and the second portion, and an angle between the second portion and the third portion is equivalent to an angle between the fourth portion and the first portion.

A configuration is possible in which the intermediate member includes:

a first portion bonded to the energy absorbing member, a second portion joined to the bumper reinforcement, and a third portion and a fourth portion that connect the first portion to the second portion, and a line length of the first portion is equivalent to a line length of the second portion, and a line length of the third portion is equivalent to a line length of the fourth portion.

Advantageous Effects of Invention

According to the present disclosure, a bumper structural body can be provided that is capable of suppressing cracking and buckling of the bumper reinforcement, and efficiently absorbing energy.

DESCRIPTION OF EMBODIMENTS

Hereinafter, exemplary embodiments of the present disclosure are described to more specifically clarify the present disclosure. However, the present disclosure is not limited in any manner by the following embodiments. Moreover, it should be understood that, in addition to the following embodiments and the specific recitations given above, various changes, modifications, improvements, and the like can be implemented on the basis of the knowledge of a person skilled in the art without departing from the spirit of the present disclosure.

First, the structure of a bumper structural body 100 according to the present embodiment is mainly described while referencing FIGS. 1 to 4. In the following description, an X-axis direction is defined as a width direction of a vehicle, a Y-axis direction is defined as a front-back direction of the vehicle, and a Z-axis direction is defined as a height direction of the vehicle. The bumper structural body 100 is provided on the front side of the vehicle, and the +Y direction is the vehicle front.

Figure 1:
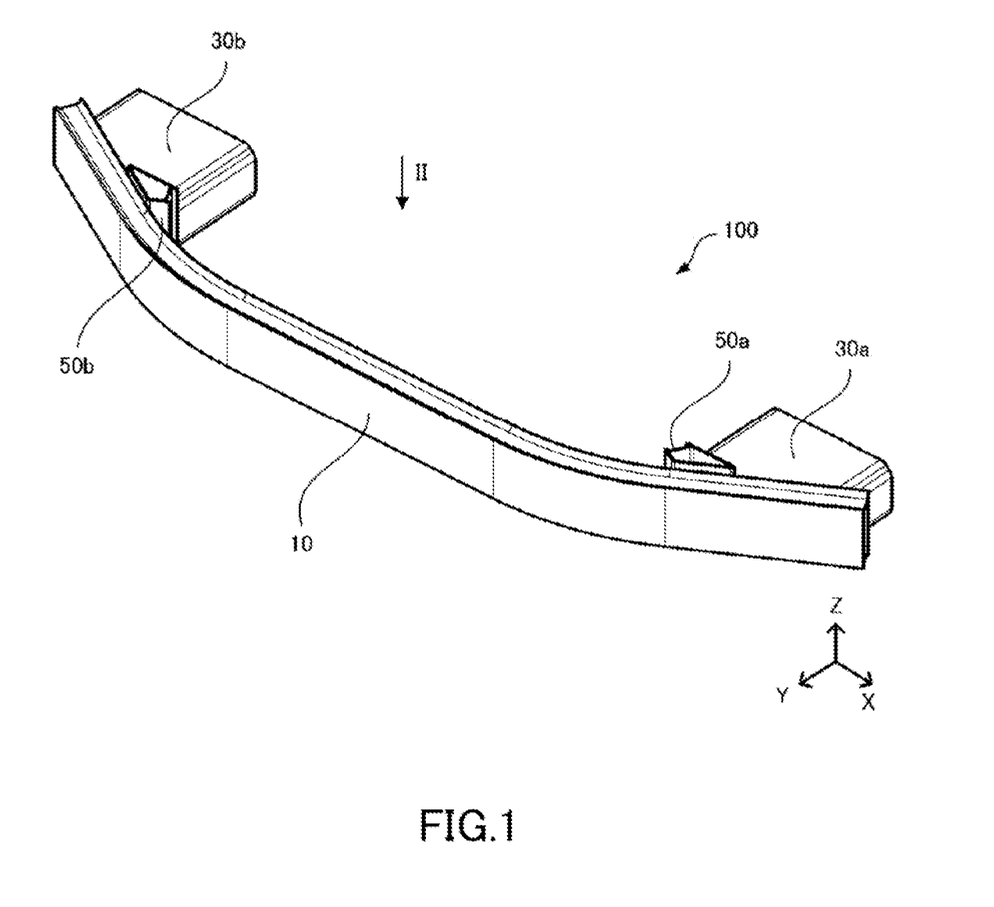
FIG. 1 is a perspective view illustrating a bumper structural body according to an embodiment of the present disclosure.

As illustrated in FIG. 1, the bumper structural body 100 includes a bumper reinforcement 10, energy absorbing members 30a, 30b, and intermediate members 50a, 50b. The locations at which the various members contact each other are joined by welding or a similar method.

The bumper reinforcement 10 is formed from an extruded shaped member of aluminum alloy that has the cross-section illustrated in FIG. 4 (described later). The bumper reinforcement 10 is formed by bending the straight extruded shaped member at bends 13a, 13b. As a result, as illustrated in FIG. 2, the bumper reinforcement 10 includes sloped sections 12a, 12b, and a straight line section 11 on the vehicle outside.

The energy absorbing members 30a, 30b are called "crash cans" and are members that deform at a time of collision to absorb collision energy. The energy absorbing members 30a, 30b are aluminum alloy members that have the same shape, and are arranged with left-right symmetry. Each of the energy absorbing members 30a, 30b is formed from an extruded shaped member of aluminum alloy having the cross-section illustrated in FIG. 5 (described layer).

Figure 2:
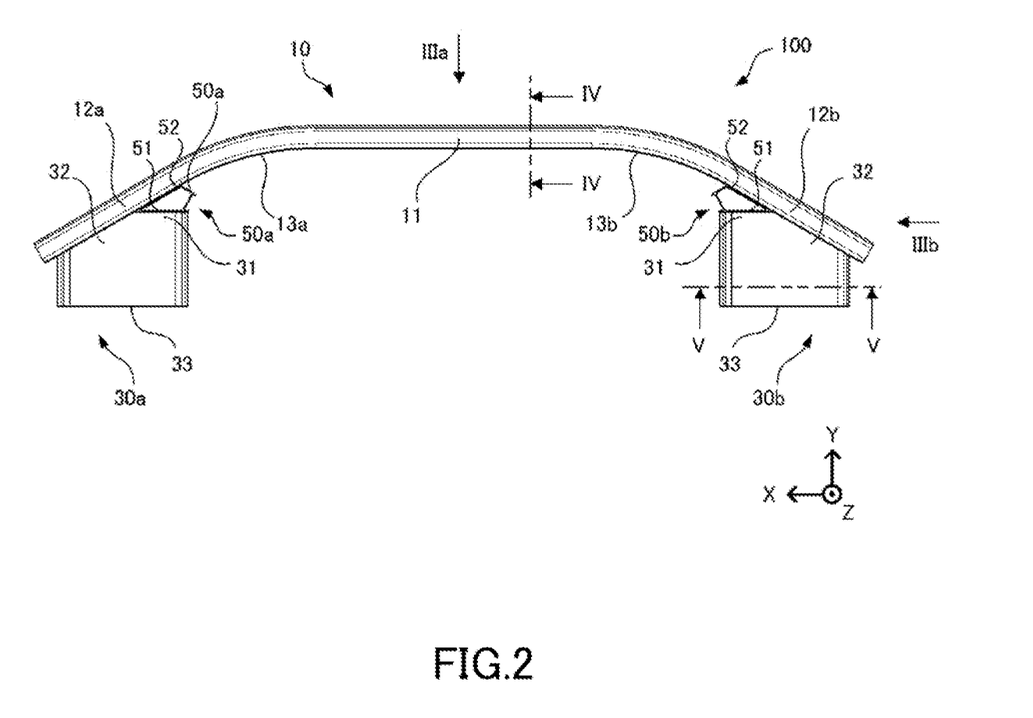
FIG. 2 is a front view illustrating the bumper structural body, viewed in the direction of arrow II of FIG. 1.

As illustrated in FIG. 2, each of the energy absorbing members 30a, 30b includes a front end 31, a slope 32, and a back end 33.

The front end 31 is arranged so as to face outward from the vehicle, and has an end surface that is parallel to the straight line section 11 of the bumper reinforcement 10.

The slope 32 is continuous with the front end 31, and contacts the inside of the sloped sections 12a, 12b of the bumper reinforcement 10.

The back end 33 is positioned so as to face inward to the vehicle, and has an end surface that is parallel to the straight line section 11 of the bumper reinforcement 10.

The intermediate members 50a, 50b illustrated in FIG. 2 are aluminum alloy members that have the same shape, and are arranged with left-right symmetry. The intermediate members 50a, 50b each include a first portion 51 and a second portion 52.

The first portion 51 is a plate-like portion that contacts the front end 31 of the energy absorbing members 30a, 30b. Accordingly, the intermediate members 50a, 50b are positioned more to the vehicle outside than the energy absorbing members 30a, 30b.

The second portion 52 contacts the inside of the sloped sections 12a, 12b of the bumper reinforcement 10. Contact surfaces between the second portion 52 and the sloped sections 12a, 12b are adjacent to contact surfaces between the slope 32 and the sloped sections 12a, 12b.

The first portion 51 and the second portion 52 are connected to each other at a position near the slope 32 of the energy absorbing members 30a, 30b. Additionally, ends of the first portion 51 and the second portion 52 on sides opposite the connection are connected via a member described in FIG. 6.

Figure 3A:
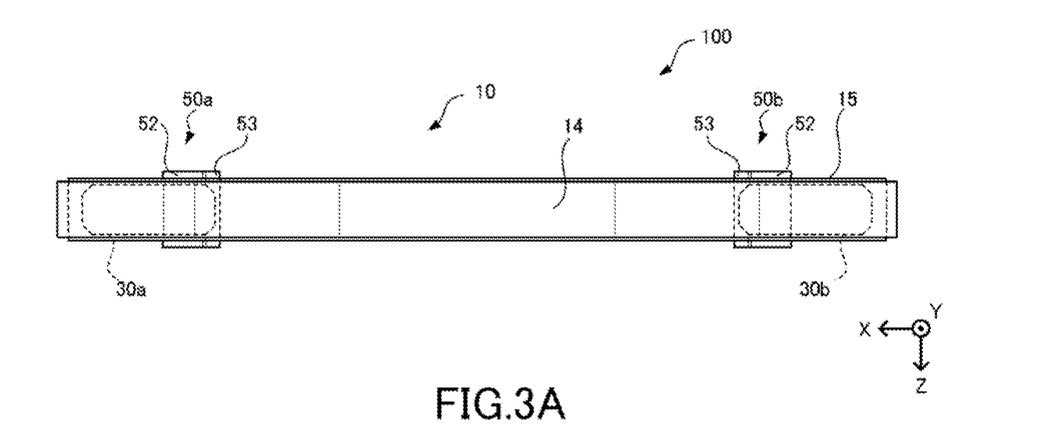
FIG. 3A is a drawing illustrating the bumper structural body, viewed in the direction of arrow IIIa of FIG. 2.
Figure 3B:
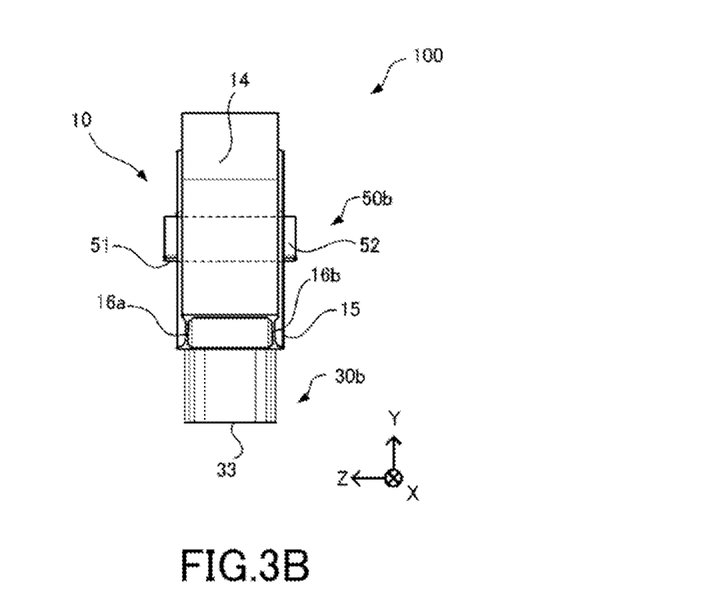
FIG. 3B is a drawing illustrating the bumper structural body, viewed in the direction of arrow IIIb of FIG. 2.

As illustrated in FIGS. 3A and 3B, each of the energy absorbing members 30a, 30b has a width in the Z-axis direction that is slightly smaller than a width of a rear plate 15. Here, the rear plate 15 is a surface of the bumper reinforcement 10 on the vehicle inside. Additionally, each of the energy absorbing members 30a, 30b is arranged in the X-axis direction between an outermost position of the rear plate 15 and a centermost position of each of the intermediate members 50a, 50b.

The intermediate members 50a, 50b each have a width in the Z-axis direction that is slightly larger than the width of the rear plate 15.

Next, cross-sectional shapes and the like of the various members described above are described in detail.

Figure 4:
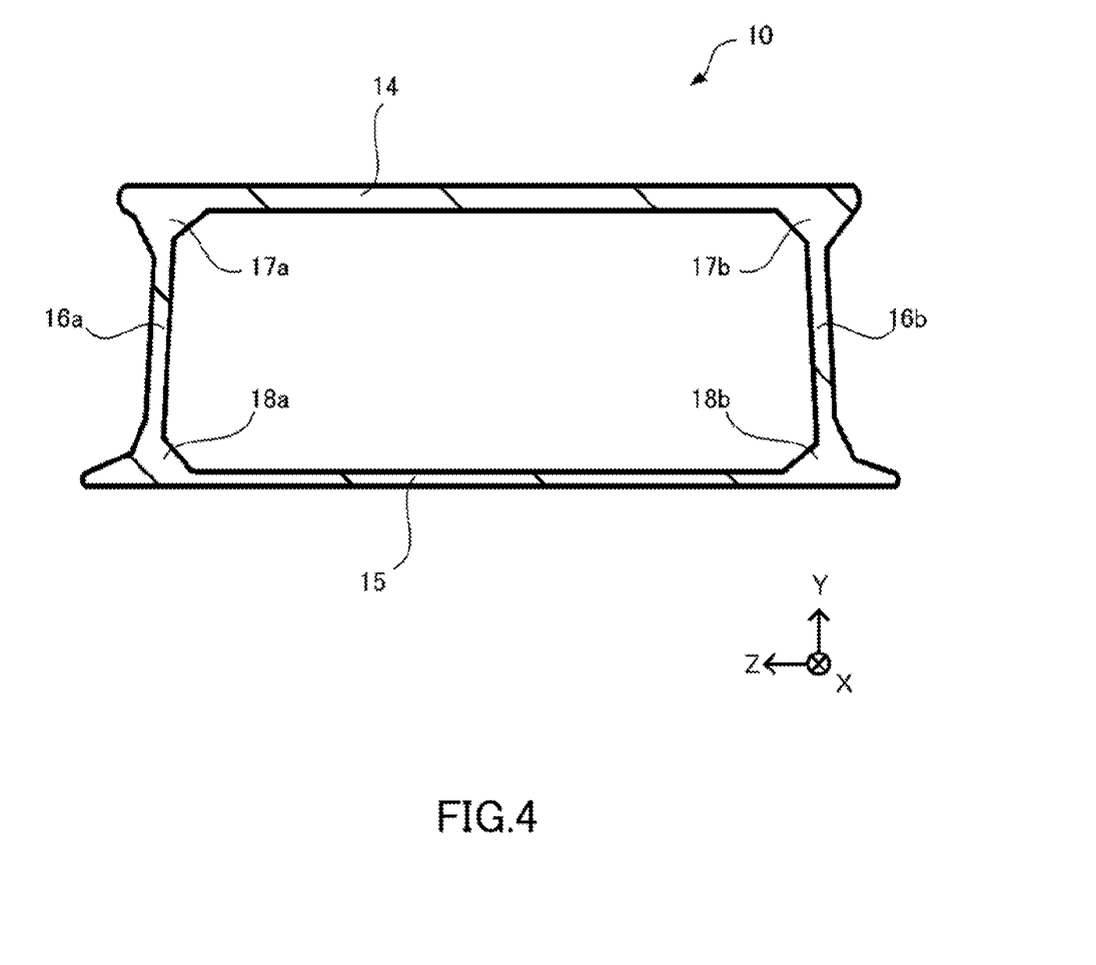
FIG. 4 is a cross-sectional view of a bumper reinforcement of the bumper structural body, taken along line IV-IV of FIG. 2.

The bumper reinforcement 10 has the cross-sectional shape illustrated in FIG. 4. The bumper reinforcement 10 includes a front plate 14, the rear plate 15, connecting plates 16a, 16b, intersections 17a, 17b, and intersections 18a, 18b.

The front plate 14 and the rear plate 15 are respectively formed as plates that are parallel in the Z-axis direction. The front plate 14 on the vehicle outside has a width that is somewhat narrower than the width of the rear plate 15 on the vehicle inside. Additionally, the rear plate 15 has a thickness that is somewhat thinner than a thickness of the front plate 14.

The front plate 14 and the rear plate 15 are connected via the connecting plates 16a, 16b at the intersections 17a, 17b and the intersections 18a, 18b. The spacing between the intersections 17a, 17b on the front plate 14 side are slightly narrower than the spacing between the intersections 18a, 18b on the rear plate 15 side. In the illustrated example, the thickness of the connecting plates 16a, 16b is somewhat thinner than the thickness of the front plate 14, and somewhat thicker than the thickness of the rear plate 15. Note that the thicknesses of the various members are not limited thereto. The intersections 17a, 17b and the intersections 18a, 18b are formed so as to have a shape in which the thickness is increased on both sides with respect to the thickness of the connecting plates 16a, 16b.

Figure 5:
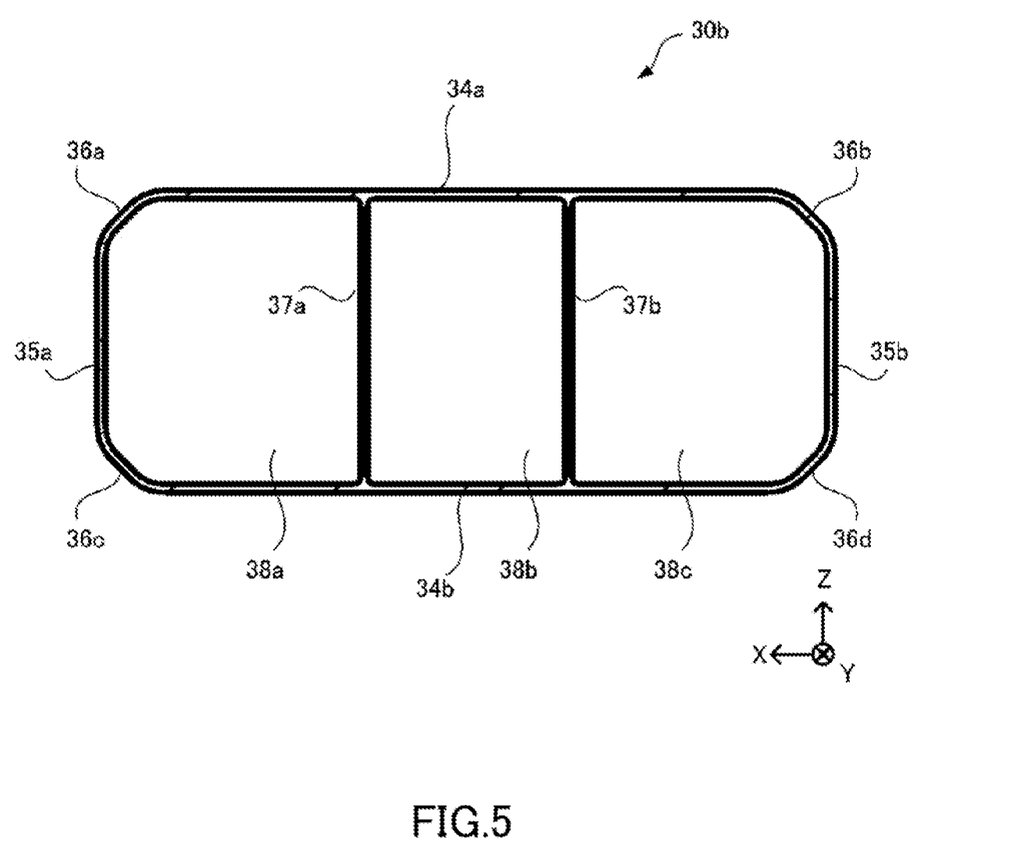
FIG. 5 is a cross-sectional view of an energy absorbing member of the bumper structural body, taken along line V-V of FIG. 2.

The energy absorbing member 30b has the cross-sectional shape illustrated in FIG. 5. The energy absorbing member 30a has the same cross-sectional shape as the energy absorbing member 30b. Each of the energy absorbing members 30a, 30b includes side walls 34a, 34b, side walls 35a, 35b, corners 36a, 36b, 36c, 36d, ribs 37a, 37b, and hollows 38a, 38b, 38c. The side walls 34a, 34b, the side walls 35a, 35b, the corners 36a, 36b, 36c, 36d, and the ribs 37a, 37b are all thin plates that have the same thickness. Note that the thicknesses of the various members are not limited thereto.

The side walls 34a, 34b constitute a pair of side walls that face each other, and are parallel to the X-axis direction. The side walls 35a, 35b constitute a pair of side walls that face each other, and are parallel to the Z-axis direction. In FIG.

5, the side walls 34a, 34b have a width that is wider than a width of the side walls 35a, 35b. Due to the side walls 34a, 34b and the side walls 35a, 35b, the cross-section of each of the energy absorbing members 30a, 30b has a substantially rectangular shape.

The corner 36a is arranged at a boundary between the side wall 34a and the side wall 35a. The corner 36b is arranged at a boundary between the side wall 34a and the side wall 35b. The corner 36c is arranged at a boundary between the side wall 34b and the side wall 35a. The corner 36d is arranged at a boundary between the side wall 34b and the side wall 35b. The corners 36a, 36b, 36c, 36d are arranged sloped so as to chamfer the four corners of the cross-sectional shape of the each of the energy absorbing members 30a, 30b.

The side walls 34a, 34b are connected by the ribs 37a, 37b at two locations. The ribs 37a, 37b are arranged parallel to the side walls 35a, 35b. Due to the ribs 37a, 37b, the hollows 38a, 38b, 38c are formed in the cross-sectional shape of each of the energy absorbing members 30a, 30b. The hollow 38a and the hollow 38c have the same cross-sectional area, and are arranged symmetrical with respect to a center axis along the Z-axis direction. The hollow 38b that is arranged between the hollow 38a and the hollow 38c has a cross-sectional area that is somewhat smaller than the cross-sectional area of the hollows 38a and 38c.

As a result of having a cross-section along the Y-axis direction such as illustrated in FIG. 5, each of the energy absorbing members 30a, 30b buckles and deforms at a time of collision of the vehicle and absorbs the collision energy.

Figure 6:
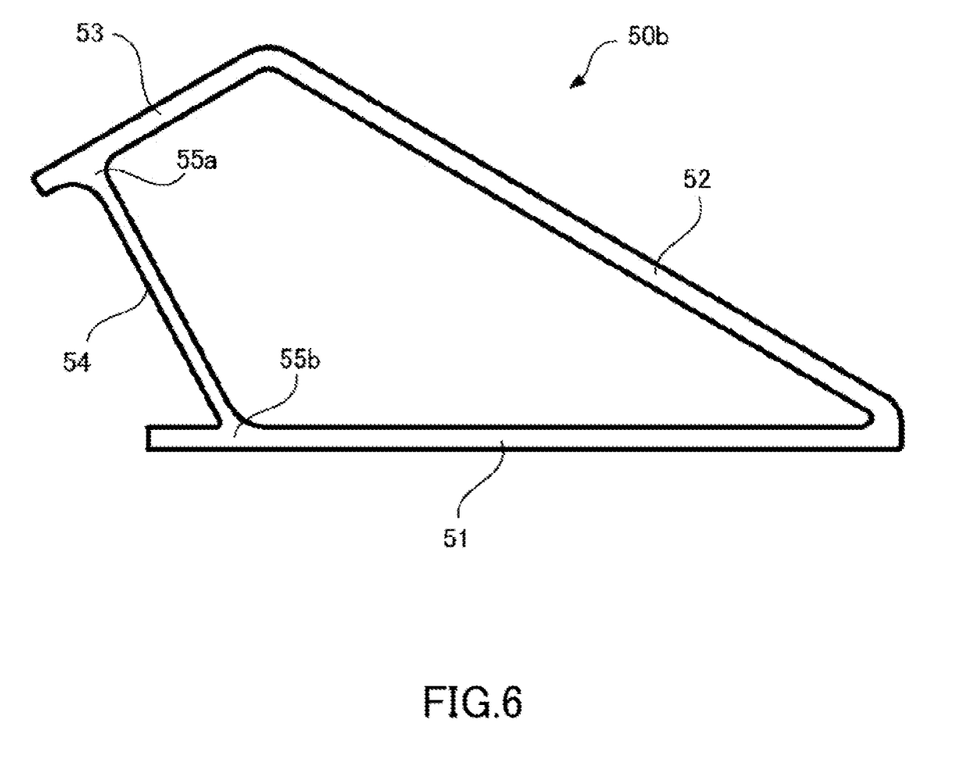
FIG. 6 is a drawing illustrating an intermediate member of the bumper structural body in an enlarged state.

As illustrated in FIG. 6, in which the intermediate member 50b is illustrated in an enlarged manner, the intermediate member 50b includes a first portion 51, a second portion 52, a third portion 53, a fourth portion 54, and intersections 55a, 55b. The intermediate member 50a includes the same portions as the intermediate member 50b. Each of the intermediate members 50a, 50b has a cross-section along the Z-axis with the shape illustrated in FIG. 6. Note that the Z-axis is the height direction of the vehicle.

As described above, the first portion 51 contacts the front end 31 of the energy absorbing member 30a, 30b. The second portion 52 contacts the sloped section 12a, 12b of the bumper reinforcement 10. Accordingly, the first portion 51 and the second portion 52 are connected so as to form a predetermined acute angle.

The third portion 53 is connected to an end of the second portion 52 on the side opposite the first portion 51. The second portion 52 and the third portion 53 are connected so as to form a predetermined obtuse angle.

The third portion 53 and the first portion 51 are connected via the fourth portion 54 at the intersections 55a, 55b near the ends on the sides of the third portion 53 and the first portion 51 opposite the second portion 52. The third portion 53 and the fourth portion 54, and the first portion 51 and the fourth portion 54 are respectively connected so as to form obtuse angles. The angle between the first portion 51 and the fourth portion 54 is larger than the angle between the third portion 53 and the fourth portion 54. Additionally, due to the third portion 53 being connected to the first portion 51, the first portion 51, the second portion 52, the third portion 53, and the fourth portion 54 connect to form a deformed quadrilateral in the direction illustrated in FIG. 5.

In other words, the first portion 51 contacting the energy absorbing member 30a, 30b and the second portion 52 contacting the bumper reinforcement 10 are connected via the third portion 53 and the fourth portion 54.

Line lengths of the first portion 51 and the second portion 52 are formed so as to be longer than line lengths of the third portion 53 and the fourth portion 54. The line length of the first portion 51 is equivalent to the line length of the second portion 52. The line length of the third portion 53 is equivalent to the line length of the fourth portion 54. In this case, the line lengths being equivalent does not necessarily mean that the line lengths are the same. The line length of the first portion 51 is somewhat shorter than the line length of the second portion 52, and the line length of the third portion 53 is somewhat shorter than the line length of the fourth portion 54, but the present embodiment is not limited thereto.

The first portion 51, the second portion 52, and the third portion 53 all have the same thickness. The fourth portion 54 has a thickness that is thinner than the other portions. Note that the thicknesses of the various members are not limited thereto. Additionally, the first portion 51, the second portion 52, the third portion 53, and the fourth portion 54 all have the same width along the Z-axis direction in FIGS. 3A and 3B.

In the present embodiment, the intermediate members 50a, 50b of the extruded shaped member are arranged between the bumper reinforcement 10 and the energy absorbing members 30a, 30b. The intermediate members 50a, 50b suppress stress concentration in the joints between the front ends of the sloped energy absorbing members 30a, 30b and bumper reinforcement 10. As a result, the origin of deformation of the bumper reinforcement 10 can be provided on tri-junctions of the intermediate members 50a, 50b, the energy absorbing members 30a, 30b, and the bumper reinforcement 10. In addition, the joints between the energy absorbing members 30a, 30b and the bumper reinforcement 10 are in complete contact, and load propagation is improved. As a result, energy can be efficiently absorbed.

In the present embodiment, the first portion 51, the second portion 52, the third portion 53, and the fourth portion 54 are connected so as to form a quadrilateral. Additionally, the angle between the third portion 53 and the fourth portion 54 is larger than the angle between the first portion 51 and the second portion 52. Furthermore, the angle between the second portion 52 and the third portion 53 is equivalent to the angle between the fourth portion 54 and the first portion 51. Due to this configuration, deformation by a low load is more likely to occur and, as such, the cross-sectional characteristics of the energy absorbing members 30a, 30b can be utilized in the load regions of the energy absorbing members 30a, 30b. Thus, according to the present embodiment, in a load-stroke line graph of a time of vehicle collision, the load that the energy absorbing members are subjected to can be raised early.

In the present embodiment, in the quadrilateral of the intermediate member 50b illustrated in FIG. 6, the line length of the first portion 51 is equivalent to the line length of the second portion 52. Additionally, the line length of the third portion 53 is equivalent to the line length of the fourth portion 54. That is, in the intermediate members 50a, 50b, the line length of the first portions 51 that contact the energy absorbing members 30a, 30b are equivalent to the line length of the second portions 52 that contact the bumper reinforcement 10. Due to this configuration, the intermediate members 50a, 50b deform by folding without crumpled areas occurring. Accordingly, stress does not concentrate in a single portion and the load can be propagated across a broad surface by the energy absorbing members 30a, 30b. As a result, energy absorbing efficiency can be improved.

Note that the thicknesses and dimensions of the various members can be determined freely within the scope of the spirit of the present disclosure.

Additionally, a configuration is possible in which the bumper structural body 100 is provided on the rear side of the vehicle, and the +Y direction is the vehicle rear.

EXAMPLES

Hereinafter, exemplary examples of the present disclosure are described to more specifically clarify the present disclosure. However, the present disclosure is not limited to these example.

Figure 7A:
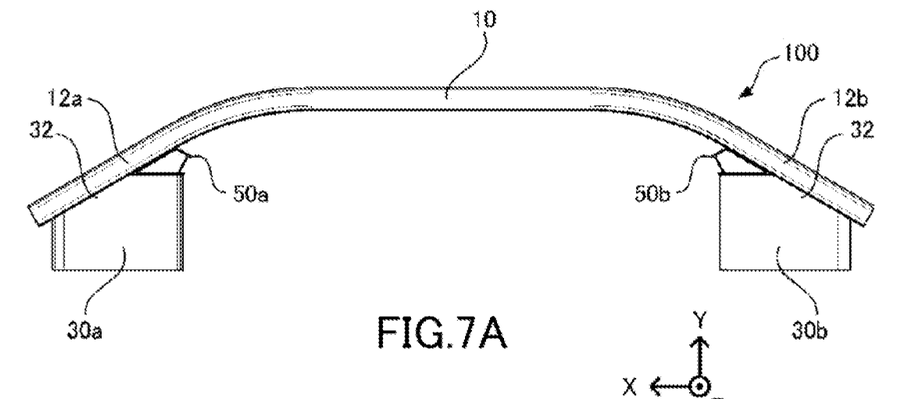
FIG. 7A is a front view illustrating a model of a bumper structural body of a present disclosure example used in a finite element method (FEM) analysis.

FIG. 7A illustrates a front view of a model of a present disclosure example. The bumper structural body 100 of the present disclosure example has the structure described in the embodiment.

Figure 7B:
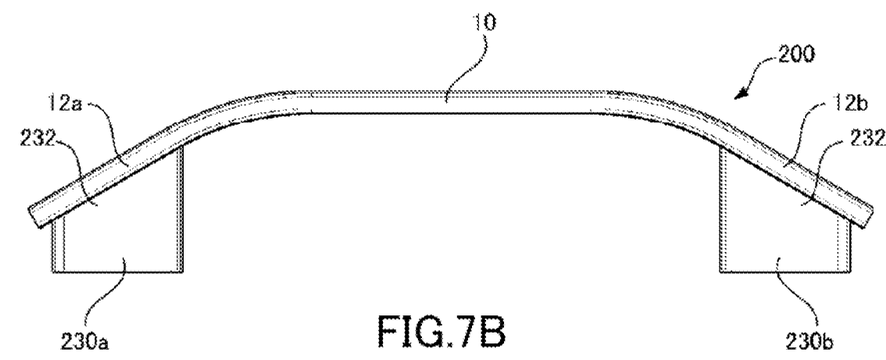
FIG. 7B is a front view illustrating a model of a bumper structural body of Comparative Example 1.

FIG. 7B illustrates a front view of a model of Comparative Example 1. A bumper structural body 200 of Comparative Example 1 includes energy absorbing members 230a and 230b that have a shape different from that of the energy absorbing members 30a, 30b. Additionally, the bumper structural body 200 does not include components corresponding to the intermediate members 50a, 50b. Therefore, the energy absorbing members 230a and 230b do not include portions corresponding to the front ends of the energy absorbing members 30a, 30b. The energy absorbing members 230a and 230b are provided with slopes 232 in the entire width direction of FIG. 7B.

Figure 7C:
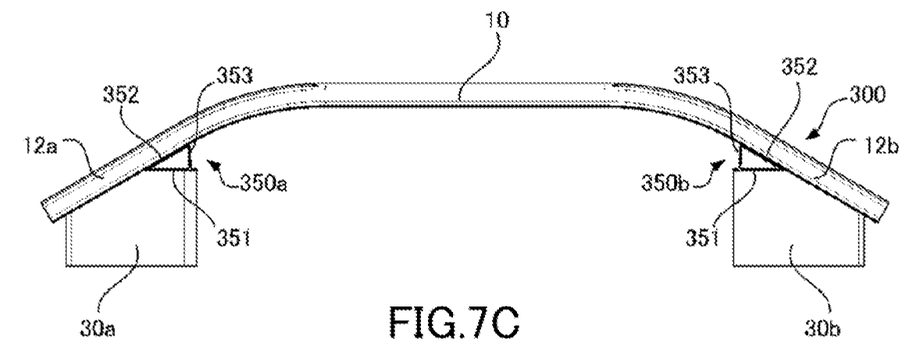
FIG. 7C is a front view illustrating a model of a bumper structural body of Comparative Example 2.

FIG. 7C illustrates a front view of a model of Comparative Example 2. The bumper structural body 300 includes intermediate members 350a and 350b instead of the intermediate members 50a, 5b.

The intermediate members 350a and 350b each include a first portion 351, a second portion 352, and a third portion 353. The first portion 351 and the second portion 352 have line lengths that are equivalent to the line lengths of the first portion 51 and the second portion 52 of the intermediate members 50a, 50b. The third portion 353 differs from the third portion 53 and the fourth portion 54 of the intermediate members 50a, 50b. The third portion 353 is arranged so as to form a triangle in which the angle between the first portion 351 and the second portion 352 is an acute angle close to a right angle.

In each of the models of FIGS. 7A to 7C, the total length in the X-axis direction, which is the vehicle width direction, was 1454 mm, and the total width in the Y-axis direction, which is the vehicle front-back direction, was 313 mm.

FEM analyses were conducted for the model of the present disclosure example, and the models of Comparative Example 1 and Comparative Example 2 that are outside the scope of the present disclosure. In the FEM analyses, a full wrap frontal collision of the vehicle was simulated.

In the material models of the FEM analyses, the bumper reinforcement was formed from an aluminum alloy extruded material. The energy absorbing members and the intermediate members were formed from 6000-series aluminum alloy extruded material with a 0.2% proof stress of 180 MPa.

RADIOSS (registered trademark), which is general-purpose finite element analysis software, was used for the FEM analyses. For the restraint conditions of the end of the energy absorbing member, a case in which single plates were installed by welding was assumed, thereby restraining displacement and rotation other than in the crushing direction. A mode in which a rigid body was pushed in was used.

Figure 8:
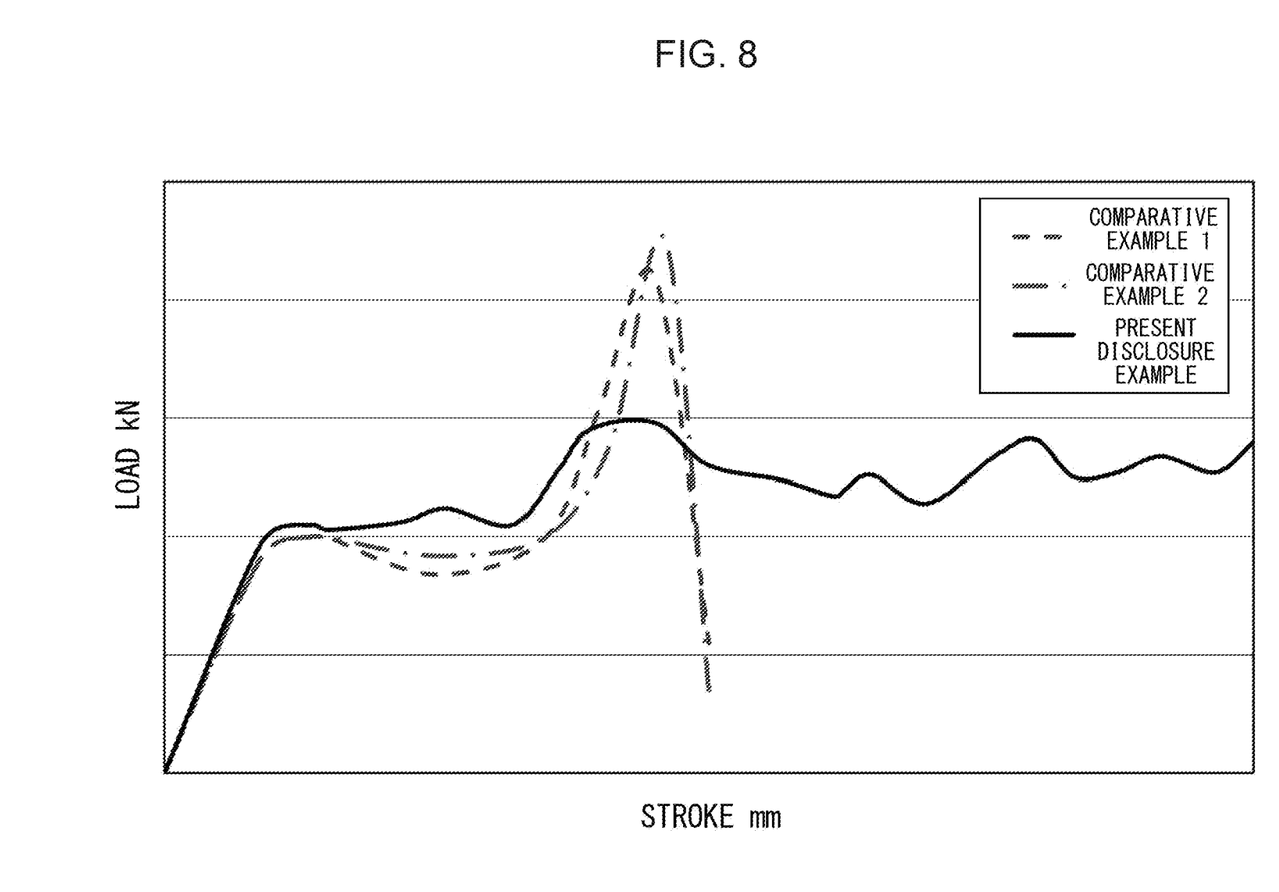
FIG. 8 is a load-stroke line graph illustrating the FEM analysis results of the present disclosure example, Comparative Example 1, and Comparative Example 2.

The analysis results are illustrated in the load-stroke line graph of FIG. 8. The model of the present disclosure example is indicated by the solid line. The model of Comparative Example 1, without the intermediate members, is indicated by the dashed line. The model of Comparative Example 2, in which the intermediate members are triangular, is indicated by the dash-dot line.

In both Comparative Example 1 and Comparative Example 2, the load rises suddenly in the energy absorbing member region at mid-stroke, and then falls.

From the results of the load-stroke lines of Comparative Example 1 and Comparative Example 2, it can be ascertained that, in both cases, deformation and cracking occurs in the vertical walls of the bumper reinforcement in the energy absorbing member region at mid-stroke. When the bumper reinforcement buckles or cracks before the energy absorbing members buckle in this manner, stable energy absorbing of late-stroke deformation is not possible.

In contrast, with the present disclosure example, a sudden increase and decrease of the load was not observed in the energy absorbing member region at mid-stroke, and a stable load-stroke line was obtained.

From the results illustrated in the load-stroke line graph, buckling and/or cracking of the bumper reinforcement 10 does not occur in the model of the bumper structural body 100 of the present disclosure in which the intermediate members 50a, 50b are quadrilateral. As a result, stable deformation up to the late stage of the stroke can be obtained. By configuring the intermediate members 50a, 50b in this manner, smooth stress propagation can be obtained.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2018-068241, filed on Mar. 30, 2018, the entire disclosure of which is incorporated by reference herein.

INDUSTRIAL APPLICABILITY

The bumper structural body according to the present disclosure can be advantageously used as a constituent member of a bumper for a vehicle such as an automobile.

REFERENCE SIGNS LIST

10 Bumper reinforcement
11 Straight line section
12a, 12b Sloped section
13a, 13b Bend
14 Front plate
15 Rear plate
16a, 16b Connecting plate
17a, 17b Intersection
18a, 18b Intersection
30a, 30b, 230a, 230b Energy absorbing member
31 Front end
32, 232 Slope
33 Back end
34a, 34b Side wall
35a, 35b Side wall 36a, 36b, 36c, 36d Corner
37a, 37b Rib
38a, 38b, 38c Hollow
50a, 50b, 350a, 350b Intermediate member
51, 351 First portion
52, 352 Second portion
53, 353 Third portion
54 Fourth portion
55a, 55b Intersection
100, 200, 300 Bumper structural body

The invention claimed is:

1. A bumper structural body, comprising:
a bumper reinforcement extending in a vehicle width direction of a vehicle;
an energy absorbing member connected to a vehicle frame and to the bumper reinforcement; and
an intermediate member arranged between the bumper reinforcement and the energy absorbing member, and joined to each of the bumper reinforcement and the energy absorbing member; wherein
the bumper reinforcement is joined to each of the energy absorbing member and the intermediate member,
the intermediate member includes:
a first portion joined to the energy absorbing member,
a second portion joined to the bumper reinforcement, and
a third portion and a fourth portion that connect the first portion to the second portion,
the first portion, the second portion, the third portion, and the fourth portion are connected so as to form a quadrilateral,
an angle between the third portion and the fourth portion is larger than an angle between the first portion and the second portion, and an angle between the second portion and the third portion is equivalent to an angle between the fourth portion and the first portion.

2. The bumper structural body according to claim 1, wherein:
a line length of the first portion is equivalent to a line length of the second portion, and a line length of the third portion is equivalent to a line length of the fourth portion.

* * * * *